Figure 1A:
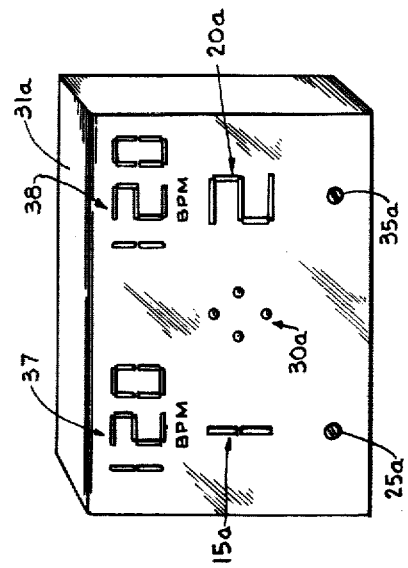

United States Patent [19]

Lambl

[11] 4,300,225
[45] Nov. 10, 1981

[54] DISCO BEAT METER

[76] Inventor: George R. Lambl, 3026 Old Banksville Rd., Pittsburgh, Pa. 15216

[21] Appl. No.: 65,273

[22] Filed: Aug. 9, 1979

[51] Int. Cl.³ .......................... G11B 3/00; G11B 27/00
[52] U.S. Cl. ........................................... 369/2; 369/4; 84/464 R
[58] Field of Search ............... 179/100.1 R, 100.1 PS, 179/100.1 VC, 100.3 D, 100.3 P, 100.3 S, 100.4 R, 100.4 D, 100.4 ST, 100.4 PT, 1 VC, 1 SW, 1 VL; 360/13, 15, 61, 79; 84/1.02, 4, 464, 170, 461, 470 R, 470 P, 477 R; 369/2-4

[56] References Cited

U.S. PATENT DOCUMENTS

| | | | |
|---|---|---|---|
| 1,775,019 | 9/1930 | Cook | 179/100.3 S |
| 1,834,886 | 12/1931 | Barton | 179/100.3 S |
| 1,931,035 | 10/1933 | Reynolds | 179/100.4 PT |
| 1,989,963 | 2/1935 | Baker | 179/100.3 S |
| 2,416,353 | 2/1947 | Shipman | 179/100.3 P |
| 2,617,893 | 11/1952 | Sinnett et al. | 179/100.4 PT |
| 3,919,915 | 11/1975 | Isbell | 84/464 |
| 4,028,985 | 6/1977 | Merritt | 84/464 B |
| 4,193,257 | 3/1980 | Watkins | 84/464 B |

OTHER PUBLICATIONS

Heathkit Catalog 816, pp. 68-69, 76, Summer 1977.

*Primary Examiner*—Raymond F. Cardillo, Jr.
*Attorney, Agent, or Firm*—Harold A. Williamson

[57] ABSTRACT

This invention relates to a system that will allow plural turntable recorded music sources that can have unique basic bass rhythm beat patterns played consecutively with the basic bass rhythm patterns synchronized such that a listener of the music senses that the bass beat rhythm patterns appear uninterrupted from one recorded musical piece to the next. Each of the music sources have means to vary the basic rhythm rate. The system included in combination a first and a second input signal representative of the sources of recorded music. There are provided first and second bass beat rhythm detectors respectively electrically coupled to the plural sources of recorded music to receive the first and the second input signals and provide a first and a second output signal which contain exclusively the bass beat rhythm of the respective sources. A signal emitting coincident beat signal detector is electrically coupled to the first and the second bass beat rhythm detectors to receive the first and the second output signals. The coincident beat signal detector emitting a signal whenever the bass beat rhythm patterns are coincident. The presence of this emitted signal allows an operator of the system to phase one of the recorded musical sources out and continue to play the other source of recorded music without missing a basic bass beat.

10 Claims, 4 Drawing Figures

DISCO BEAT METER

This invention relates to a continuously synchronized musical beat system for use with plural sources of recorded music.

More specifically, this invention relates to a system that will allow plural turntable recorded music sources that can have unique basic bass rhythm beat patterns played consequtively with the basic bass rhythm patterns synchronized such that a listener of the music senses that the bass rhythm patterns appear uninterrupted from one recorded musical piece to the next. Each of the music sources have means to vary the basic rhythm rate. The system included in combination a first and a second input signal representative of the sources of recorded music. There are provided first and second bass beat rhythm detectors respectively electrically coupled to the plural sources of recorded music to receive the first and the second input signals and provide a first and a second output signal which contain exclusively the bass beat rhythm of the respective sources. A signal emitting coincident beat signal detector is electrically coupled to the first and the second bass beat rhythm detectors to receive the first and the second output signals. The coincident beat signal detector emitting a signal whenever the bass beat rhythm patterns are coincident. The precence of this emitted signal allows an operator of the system to phase one of the recorded musical sources out and continue to play the other source of recorded music without missing a basic bass beat.

The continuous uninterrupted playing of recorded music received its earliest technical innovations beginning in the earliest sound movies. Historically, the primary concern of technicians was that of providing smooth transition from one musical piece to the next. The advent of discotheque dance business has created a fresh and distinct added problem of providing an extended playing time of quality disco music in which the beat of the music to the ear of the dancer is without interruption. The discotheque sound systems conventionally employ at least two turntables. One of these turntables is used for previewing i.e. cueing a record to be added in an uninterrupted beat-wise fashion to music which is actively playing through the system via the second turntable. In the cueing mode, the party superintending the transition i.e. the disc jockey, aurally matches the beat timing of the next musical piece to be played with the musical piece then actively playing through the system. In order to accomplish a beat match or synchronization as it will be termed hereafter, the disc jockey must be manual means either cause the record to slip on the turntable or the speeds of the turntables must be varied until the "ear" of the disc jockey discerns that beat synchronization is present. At this point in time the disc jockey will fade out the actively played musical piece and bring in the musical piece that was previewed and there will be present beat continuity between musical pieces.

It is well recognized that disco dancers caught up in the rhythm and spell of their dancing will have the spell broken if the beat between musical pieces is not flawlessly executed. To meet the needs of the disco industry there has arisen small but elite and gifted groups of disc jockeys that can perform the disco music mix for the many hours of evening that is required. This elite group of disc jockeys who are highly paid spend countless hours memorizing the beats per minute of each and every musical piece to be used for an evening of dance music. These disc jockeys properly think of themselves as skilled technicians.

The demand for skilled technicians such as these just described, far exceeds the supply. The invention to be described more fully hereinafter provides a system that will allow an amateur disc jockey to rise to the level of a discotheque spell binder in so far as the system containing the invention will allow for flawless beat transfer from one musical piece to the next. The invention will allow a more advanced disc jockey to readily perform such techniques as beat interleaving, chopping, echo and overdubbing all of which techniques heretofore required intense concentration and split second decisions by the disc jockey.

It is therefore a primary object of the invention to provide a system that will allow for continuous synchronized musical beat rhythm from one recorded musical piece to the next.

Another object of the invention is to provide a compact beat frequency synchronized system that can readily be added to any existing plural turntable record playing arrangement without loading or interrupting the signal path from the plural turntable record players.

Yet another object of this invention is to provide a compact apparatus that houses the system which apparatus can include visual indications of beat rate present in music coming from one or more turntables as well as a visual indication of the presence of synchronized beat rates from any two or more turntable record players.

In the attainment of the foregoing objects, the invention contemplates a continuous synchronized musical beat system for use with plural sources of recorded music. Each of the recorded music sources contains basic bass beat rhythm patterns unique to each of the recorded music sources. The music sources which include record playing turntables are provided with means to independently vary the basic bass rhythm rate of the music coming from the respective turntable source. The system includes in combination a first and a second input signal representative of the sources of recorded music. An audio mixer is electrically coupled respectively to the sources of recorded music to thereby receive the first and the second input signal. First and second bass beat rhythm detectors are respectively electrically coupled to the plural sources of recorded music to receive the first and the second input signals and provide a first and a second output signal which contain exclusively the bass beat rhythm of the respective sources.

The preferred embodiment of the system incorporates first and second light emitting displays electrically coupled respectively to the first and second bass beat rhythm detectors. The first and second light emitting displays provide a visual light emission in synchronization with the respective bass beat rhythm detected by the bass beat rhythm detectors.

The final component of the preferred embodiment of the system incorporating the invention is a visual light signal emitting coincident beat signal detector electrically coupled to the first and the second bass beat rhythm detector to receive the first and second output signals therefrom. The coincident beat signal detector emits the visual light whenever the bass beat rhythm patterns are coincident. When the aforenoted coincidence of bass beat rhythm patterns occurs, the audio mixer will have an output that will provide a continuous synchronized musical beat.

In another embodiment of the invention, the system further includes in combination a first and second digital counter electrically coupled respectively to the first and the second bass beat rhythm detectors. Each of the digital counters have a visual numeric display which provides an indication of the respective bass beat rhythm rate detected by the first and second bass beat rhythm detectors.

Figure 1:
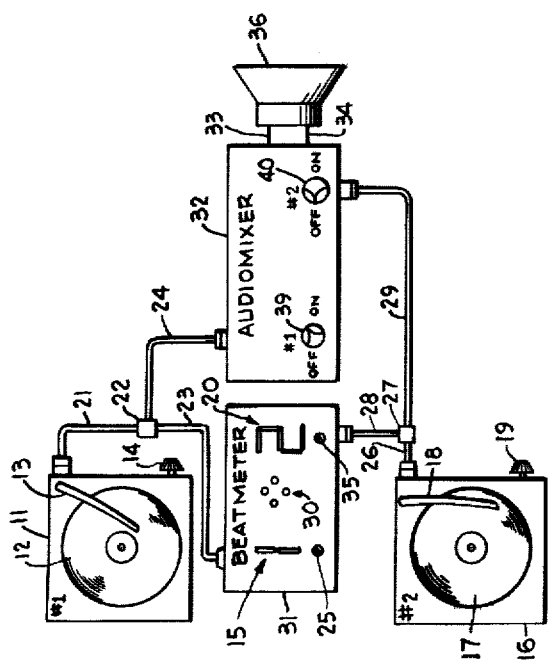
Figure 2:
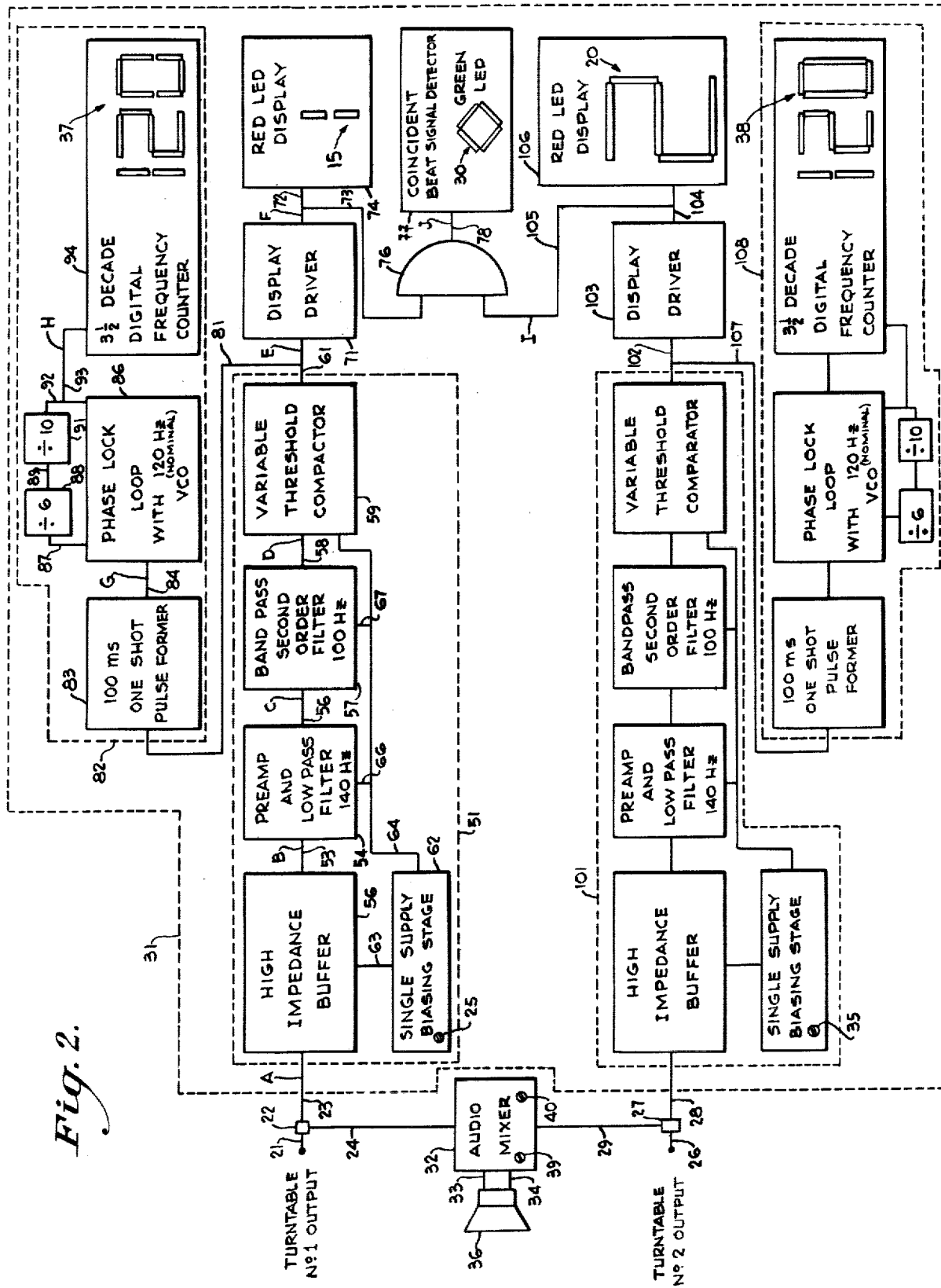
Figure 3:
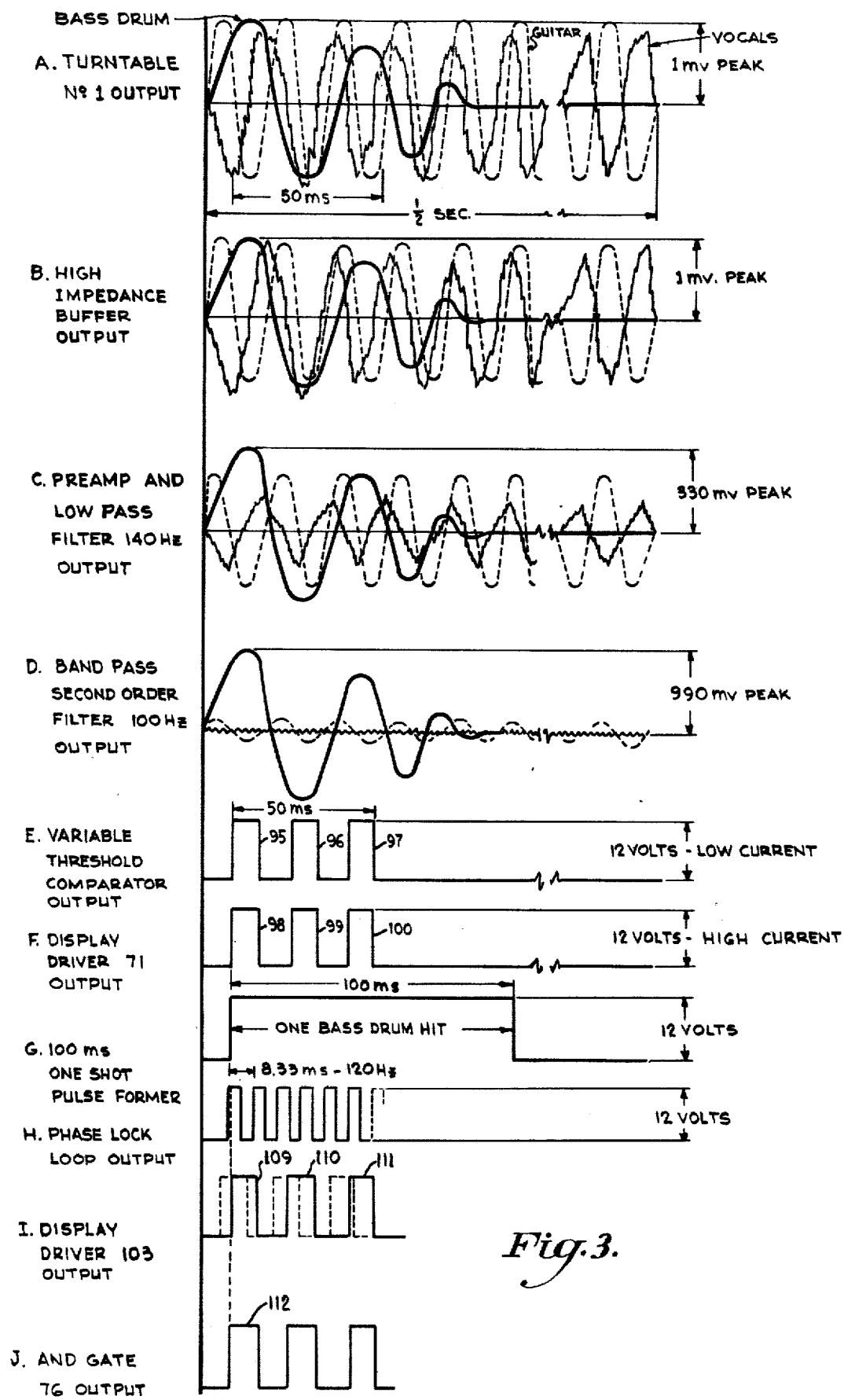

Other objects and advantages of the present invention will become apparent from the ensuing description and the illustrative embodiments thereof, in the course of which reference is made to the accompanying drawings in which:

FIG. 1 is an entire sound system incorporating the preferred embodiment of the invention; and FIG. 1A depicts a second embodiment of the invention; and FIG. 2 in block diagram form illustrates the continuous synchronized beat system embodying the invention; and FIG. 3 illustrates a variety of the waveforms that occur in the block diagram of FIG. 2.

Reference is now made to FIG. 1 in which there is illustrated in diagramatic form an entire sound system incorporating the preferred embodiment of the invention. A first turntable unit 11 and a second turntable unit 16 are shown. These turntables are of conventional design. The first turntable unit 11 is depicted with a musical record 12 positioned thereon for movement with the rotating portion of the turntable not referenced. A cartridge carrying music pick-up arm 13 is shown positioned on the record 12. The turntable unit 11 is provided with a manual turntable speed control knob 14. The turntable unit 11 and its manual speed control are not part of the invention. A second turntable unit 16 in like fashion as the first turntable unit 11 has shown thereon a record 17, music pick-up arm 18 and manual speed control knob 19.

A beat meter 31 which contains the invention is shown electrically connected to the first turntable unit 11 via coaxial cable 23, a signal splitter 22, coaxial cable 21, and to the second turntable unit 16 via coaxial cable 26, splitter 27 and coaxial cable 28.

The function and operation of the beat meter 31 will be set forth in detail hereinafter. It will suffice to say at this point that the beat meter 31 has a light emitting diode indicator 15 which is formed into the numeral "1". This indicator 15 will pulse on and off in synchronism with the bass beat rhythm pattern of the record 12 being played on the first turntable unit 11. The beat meter 31 has another light emitting diode indicator 20 which is formed into the numeral "2". This indicator 20 will pulse on and off in synchronism with the bass rhythm pattern of the record 17 being played on the second turntable unit 16.

A coincident beat signal indicator 30 fashioned of light emitting diodes turns on only when the bass beat of the music on record 12 on the first turntable unit 11 matches or is in sync with the bass beat of the music on record 17 of the second turntable unit 16. A pair of trigger sensitivity circuit adjusting screws 25 and 35 are also illustrated. The function of these adjusting screws 25 and 35 will be explained more fully hereinafter.

An audio mixer 32, a conventional component in plural turntable sound systems, is shown electrically connected to the first turntable unit 11 via coaxial cable 24, signal splitter 22, coaxial cable 21, and to the second turntable unit 16 via coaxial cable 29, signal splitter 27 and finally coaxial cable 26. The audio mixer 32 has a pair of controls 39, 40 which allow the mixer 32 to pass one or both of the audio signals representative of the music from records 12 and 17 to a amplification system and loud speaker 36 via electrical leads 33 and 34.

Reference is now made to FIG. 1A where there is illustrated another embodiment of the invention. The description of FIG. 1A will employ the same reference numerals as FIG. 1, where appropriate to designate the same component, however, the letter "a" will be added to each such reference numeral. Accordingly, there is shown a beat meter 31a which has thereon indicators 15a and 20a. A coincident beat signal indicator 30a and circuit adjusting screws 25a and 35a are also depicted. In this embodiment of the invention there are included digital read out indicators 37 and 38 which will in the manner to be described more fully hereinafter provide a numerical indication of the bass beats per minute of the music on records 12 and 17 of turntable units 11, 16 respectively.

Reference is now made to FIG. 2 where the reference numerals which were employed in FIG. 1 and FIG. 1A are utilized to identify the same components that are included in the block diagram of FIG. 2. FIG. 2 represents the embodiment of invention in its most complete form, in a sound system of the basic type employed in discotheques. The sound system illustrated in FIG. 2 is of course greatly simplified over that actually employed in modern discotheques.

A physical description of FIG. 2 follows after which the continuous synchronized musical beat system of FIG. 2, its function and operation will be set forth in detail in conjunction with the wave form timing chart of FIG. 3. Those components shown in FIG. 2 that also are included in FIG. 1 and FIG. 1A will be designated with the same reference numerals.

The first and second turntable units of FIG. 1 are not shown, however, the first turntable unit output is illustrated as being provided to coaxial cable 21 as is the second turntable output shown provided to coaxial cable 26.

The audio mixer 32 is shown electrically coupled to coaxial cable 21 and the first turntable unit output via coaxial cable 24 and signal splitter 22. In like fashion the audio mixer 32 is electrically coupled to coaxial cable 26 and the second turntable unit output via coaxial cable 29 and signal splitter 27. The audio mixer 32 feeds the sound system's loud speaker 36 via leads 33, 34.

The beat meter 31 embodying the invention is shown in dashed outline. Some of the major components of the beat meter 31 are also shown in dashed outline and these are first and second bass beat rhythm detectors 51, 101; first and second digital counters 82, 108.

The first bass beat rhythm detector 51 is electrically connected to the first turntable unit output via coaxial cable 23, signal splitter 22 and coaxial cable 21. First bass beat rhythm detector 51 includes a high impedance buffer circuit 52 which is connected by lead 53 to a preamplifier and 140 Hz low pass filter which in turn is connected by lead 56 to a 100 Hz band pass second order filter 57 and finally by lead 58 to a variable threshold comparator 59. Each of these components, namely, the high impedance buffer 52, the preamplifier and 140 Hz low pass filter 54, 100 Hz band pass second order filter 57 and the variable threshold comparator 59 are all fashioned from the same basic dual operational amplifier. Type 1458, for example, Raytheon component #RC4558 can be used for each of these components.

The high impedance buffer 52 is employed to buffer the output signal of the first turntable unit from the lower impedance filtering stages that follow. Basically, the high impedance buffer 52 passes the received signal unaltered but increases its subsequent stage driving capabilities i.e. power magnification but not voltage.

A single supply biasing stage 62 is provided for each of the operational amplifiers that are employed, respectively in high impedance buffer 52, preamplifier and 140 Hz low pass filter 54, band pass second order filter 57, the variable threshold comparator 59, via leads 63, 64, 66 and 67, respectively. A trigger sensitivity adjustment 25 is also shown. The single supply biasing stage may typically be a signal decoupled resistive divider network.

A display driver 71 is connected by lead 61 to the output of the variable threshold comparator 59 and to the input of light emitting diode (LED) display 74. The display driver 71 output is also connected to one side of an "AND" gate 76 via leads 72, 73. A coincident beat signal detector 77 is connected to the AND gate 76 by lead 78.

A first digital counter 82 shown in dashed outline is electrically connected via lead 81 to output lead 61 of the variable threshold comparator 59. A second digital counter 108 of similar construction is electrically connected to a variable threshold comparator output lead 102 of the second bass beat rhythm detector 101. The first digital counter 82 includes a 100 millesecond one shot pulse former 83 connected by lead 84 to a phase lock loop 86 with a 120 Hz nominal voltage controlled oscillator. A divide by six (6) divider 88 is connected on one side by lead 87 to the phase lock loop 86. A lead 89 connects the other side of the divider 88 to a divide by ten (10) divider 91 which in turn is connected by lead 92 to the phase lock loop 86. The operation of the one shot pulse former 83 and the phase lock loop 86—dividers 88, 91 will be set forth in greater detail in respect of the description of FIG. 3. The final component of the first digital counter 82 is a digital frequency counter 94 connected by lead 93 to lead 92 from divider 91. The digital frequency counter 94 may be of any of a number of commercially available counters that have numeric displays such as that designated by reference numeral 37. In the display illustrated the number "120" is shown by way of example to indicate that the basic bass rhythm beat of the recorded music from turntable number one output on lead 21 is one hundred twenty beats per minute.

The second bass beat rhythm detector 101 noted earlier is electrically connected respectively to the turntable number two (2) output and the audio mixer 32 by coaxial cable 28, signal splitter 27, coaxial cable 26 and by coaxial cable 28, signal splitter 27 and finally by coaxial cable 29.

The second bass beat rhythm detector 101 has an output on lead 102 which is electrically connected to display driver 103 and by leads 102, 107 to the second digital counter 108.

The display driver 103 has an output on lead 104 which is simultaneously fed to "AND" gate 76 and red LED display 106.

It will be seen in the description that follows that when bass beat rhythm of the records on turntable one and turntable two have their respective bass beat in sync there will appear simultaneously on leads 73 and 105 of AND gate 76; a signal that will allow an output to appear on the AND gate 76 output lead 78. The signal on output lead 78 will cause the coincident beat signal detector 77 to provide an indication by lighting the green LED display 30. The presence of the lighted green LED display will allow the operator of the system to then manipulate the manual controls 39 and 40 of the audio mixer 32 and fade one record's music out and the other record's music in without the listening or dancing audience being able to detect an interruption in the bass beat rhythm from one piece of music to the next.

Reference is now made to FIG. 3 which illustrates a number of waveforms that may be found in a system embodying the invention as it is shown in FIG. 2. Accordingly, FIG. 3 should be studied in conjunction with FIG. 2 where the waveforms of FIG. 3 are referenced in respect of their origin by the use of capital letters, such as "A", "B", "C", etc.

Attention is now directed to the waveforms of FIG. 3, "A" which is a simplified embodiment of the turntable number one output as it is found on coaxial cable 23. For purposes of explanation and illustration only, the waveforms shown are as indicated, (1) a single bass drum hit shown in heavy solid line and labeled as such, (2) bass guitar, shown in a dashed line manner and labeled "guitar" and (3) a jagged waveform representative of the vocal portion of the recorded music and labeled "vocals". The waveforms shown are intended to simplistically illustrate the nature of the waveforms involved for purposes of explanation in respect of the system operation of the invention.

The bass drum hit is that which the listener hears and feels in respect to the tempo of his or her dancing. The system to be described hereinafter is one in which the bass drum hit information will be extracted from all of the other musical waveform components. It should be understood that for purposes of simplifying the explanation only three waveforms indicative of three different musical components have been shown. In actuality there are as many different waveforms as there are instruments producing sound that have been stored in the record being played.

The high impedance buffer output FIG. 3, "B" presents the identical waveforms shown in FIG. 3, "A". As was noted earlier the high impedance buffer 52 of FIG. 2 acts to buffer the cartridge signal received from the pick up arm 13, FIG. 1 from the lower impedance filtering stages represented by low pass filter 54 and second order filter 57.

The preamp and 140 Hz low pass filter 54 provides very high amplification as well as providing a 6 db per octave attenuation of all frequency signals above 140 Hz per second. This output is shown in the waveforms of FIG. 3, "C", a study of which reveals that all unrelated beat musical information is essentially reduced. The waveforms shown represent the frequency average of the musical component illustrated. Not shown in the family of waveforms are such waveforms that represent cymbals which are typically over 4,000 Hz and percussion instruments typically over 200 Hz. These waveforms that represent musical information in the range above 140 Hz are filtered out.

The output from the 100 Hz band pass second order filter 57 is shown by FIG. 3, "D". The second order filter 57 functions to eliminate extremely low frequency signals induced by record warpage, turntable motor vibration induced signals as well as 60 cycle hum injected into the system due to various electromagnetic fields inherent in the environment. FIG. 3, "D" is intended to show that the system has filtered out the signals above and below 100 CPS, leaving as can be seen the bass drum hit frequency here intentionally illustrated at a rate of 100 CPS. FIG. 3, "D" clearly shows a typical bass drum hit which normally takes on the appearance of 3 to 5 cycles of damped oscillations.

The output from the variable threshold comparator 59 on lead 61 is shown in FIG. 3, "E". This output is of a low current nature providing insufficient power to drive the red LED display 74. The display driver 71 receives the signal on lead 61 shown in FIG. 3, "E" and provides on lead 72 to LED display 74 the signal shown in FIG. 3, "F". The FIG. 3, "F" signal has a signal of the same voltage but with high current.

The square wave pulses 95, 96, 97 of FIG. 3, "E" and 97, 98, 99 of FIG. 3, "F" appear at greater than thirty times a second and the red LED display 74 is pulsed at the same rate. The human eye in observing the red LED display 74 effectively integrates these rapid pulses and sees only that the turntable number one indicator 15 has been turned on once.

The first digital counter 82 operates in the following manner. The waveform of FIG. 3, "E" appears on lead 61 as well as lead 81 which provides the input to the 100 Ms one shot pulse former 83. The one shot pulse former 83 provides on lead 84 the waveform shown in FIG. 3, "G". This waveform serves to digitally filter out all subsequent peaks of bass drum signal waveform along with any other nonrelated beat information occurring in that interval. The phase lock loop 86 with its 120 Hz voltage controlled oscillator and dividers 88, 91 provide on leads 92, 93 the waveform shown in FIG. 3, "H". The train of pulses shown in FIG. 3, "H" are delivered to the three and one half decade digital frequency counter which provides a visual indication of the bass drum beats per second that are present on the record 12 from the number one turntable 11, FIG. 1.

The description of the waveforms and the system operation set forth heretofore covered the operation of the first bass beat rhythm detector 51, the display driver 71 and the red LED display 74 as well as the first digital counter 82. The operation of the second bass beat rhythm detector 101, display driver 103, red LED display 106 and the second digital counter 108 is the same as that already described.

For purposes of illustration only the record 12 of number one turntable and the record 17 of number two turntable 16 both have recorded music that has a basic bass beat rhythm of 120 beats per minute. In order to explain the system's operation it will be assumed that the bass beat rhythm of the recorded music on records 12 and 17 are in a real time sense in perfect syncronism such that one record might be faded out by the audio mixer 32, by controls 38, 40 and the other record brought in by one of the aformentioned controls 39, 40 of the audio mixer 32. This situation rarely occurs, but assuming it did, the remainder of the system's operaton can now be reviewed.

Attention is now directed to FIG. 3, "I" which shows in solid line fashion square wave pulses 109, 110, 111. Keeping in mind the above assumptions, it can be seen that pulses 109, 110, 111 which are present on leads 104, 105 will appear at AND gate 76 in a real time fashion such that the leading edge of pulse 109 is coincident in time with the leading edge of pulse 98 which is present on lead 73. The coincidence of these two pulses i.e. 98, 109 will cause the AND gate 76 to deliver the square wave pulse 112 to lead 78 which in turn will cause the coincident beat signal detector 74 with it green LED display 30 to give a visual indication that the bass beat rhythm of record 12 and record 17 are in sync or matched and that either record may be faded in or out without listeners to the system being able to hear any disruption to basic bass rhythm or tempo.

The situtation that normally occurs is that illustrated by the dashed square waveforms 115, 116, 117 shown in FIG. 3, "I". In this situation the bass beat of the recorded music from number two turntable is not in real time sync with the bass beat rhythm of the music from the number one turntable. In this situation the operator of the system need only vary the speed of either turntable by slipping the record manually or by altering the turntable speed via control knobs 14 or 19, FIG. 1, to thereby bring the bass beats into sync as will be evidenced by the lighted green LED display 30.

From the above description, it can be readily appreciated that the invention allows a user of the system to visually determine when the bass beat tempo or rhythm of two different pieces of music are in sync. No longer is there required a highly trained ear of a record spinner who possesses split second reflexes to provide a smooth mix of recorded music. The invention further allows the user of the system to instantly, visually determine the number of basic bass rhythm beats per minute of each record thereby enhancing the speed at which the record spinner can decide whether to speed up or slow down a record to accomplish the perfect match of the bass beat rhythms.

While the present invention has been illustrated and disclosed in connection with the details of the illustrative embodiment thereof, it should be understood that the illustrative embodiment is only to be limitative of the invention as set forth in the accompanying claims.

What is claimed as new is as follows:

1. A continuous synchronized musical beat system to provide a continuous musical beat audio output for use with plural sources of recorded music, each of said recorded music sources containing basic bass beat rhythm patterns unique to each of said recorded music sources, at least one of said music sources having means to vary the basic bass rhythm rate of said one of said sources of recorded music, said system including in combination, (a) a first and second bass beat rhythm detector means respectively electrically coupled to a first and a second music source of recorded music, a first and a second input signal appearing respectively on the electrical coupling between said music source and each of said detector means, each of said detector means receiving said first and said second input signals, said first and said second detector means respectively provide a first and a second output signal which contain exclusively said bass beat rhythm of said respective sources, (b) a signal emitting coincident bass beat signal detector means electrically coupled to said first and said second bass beat rhythm detector means to receive said first and said second output signals, said coincident beat signal detector means emitting a signal whenever one of said means to vary said basic bass rhythm rate has been varied to cause said bass beat rhythm patterns to be coincident.

2. The continuous synchronized musical beat system of claim 1 wherein said plural sources of recorded music are plural turntables which carry disks with music recorded thereon.

3. The continuous synchronized musical beat system of claim 2 which further includes in combination an audio mixer means electrically coupled respectively to said sources of recorded music to thereby also receive said first and said second input signal.

4. The continuous synchronized musical beat system of claim 1 wherein said signal emitting coincident beat signal detector means includes a light source to provide said signal.

5. The continuous synchronized musical beat system of claim 1 which further includes in combination first and second counter means electrically coupled respectively to said first and said second bass beat rhythm detector means, said counter means each having electrically coupled thereto a visual numeric display which provides an indication of the respective bass beat rhythm rate detected by said first and said second bass beat rhythm detector means.

6. The continuous synchronized musical beat system of claim 1 which further includes in combination first and second light emitting display means electrically coupled respectively to said first and second bass beat rhythm detector means, and first and said second light emitting display means providing a visual light emission in synchronism with the respective bass beat rhythm detected by said bass beat rhythm detector means.

7. The continuous synchronized beat system of claim 6 wherein said signal emitting coincident beat signal detector means includes a light source to provide said signal.

8. The continuous synchronized beat system of claim 7 which further includes in combination first and second counter means electrically coupled respectively to said first and said second bass beat rhythm detector means, said counters each having a visual numeric display which provides an indication of the respective bass beat rhythm rate detected by said first and said second bass beat rhythm detector means.

9. The continuous synchronized beat system of claim 8 wherein said plural sources of recorded music are plural turntables which carry disks with music recorded thereon.

10. The continuous synchronized beat system of claim 9 which further includes in combination a mixer means electrically coupled respectively to said sources of recorded music to thereby also receive said first and said second input signal, to thereby allow said one music source that can be varied basic bass rhythm ratewise to be varied until said coincident beat signal detector means emits said signal, whereby said mixer will have an audio output that will provide a continuous synchronized musical beat.

* * * * *